United States Patent
Kellner et al.

(10) Patent No.: US 12,506,191 B2
(45) Date of Patent: Dec. 23, 2025

(54) ELECTRICALLY OR PARTIALLY ELECTRICALLY OPERATED VEHICLE HAVING MEANS FOR CHANGING THE QUALITY OF A THERMAL COUPLING BETWEEN A BATTERY SYSTEM AND A STRUCTURAL COMPONENT

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE); Sascha Mostofi, Zeltingen (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 601 days.

(21) Appl. No.: 17/723,565

(22) Filed: Apr. 19, 2022

(65) Prior Publication Data
US 2022/0336884 A1    Oct. 20, 2022

(30) Foreign Application Priority Data
Apr. 20, 2021   (DE) .................. 10 2021 109 895.5

(51) Int. Cl.
H01M 10/6554    (2014.01)
H01M 10/613     (2014.01)
H01M 10/625     (2014.01)
H01M 10/6568    (2014.01)

(52) U.S. Cl.
CPC ..... H01M 10/6554 (2015.04); H01M 10/613 (2015.04); H01M 10/625 (2015.04); H01M 10/6568 (2015.04); H01M 2220/20 (2013.01)

(58) Field of Classification Search
CPC ............. H01M 10/613; H01M 10/625; H01M 10/6554; H01M 10/6568
See application file for complete search history.

(56) References Cited

U.S. PATENT DOCUMENTS

| | | |
|---|---|---|
| 11,094,970 B2 | 8/2021 | Jaensch et al. |
| 2010/0062321 A1 | 3/2010 | Nakamura |
| 2018/0269548 A1 | 9/2018 | Chi et al. |

(Continued)

FOREIGN PATENT DOCUMENTS

| | | |
|---|---|---|
| CN | 110137630 A | 8/2019 |
| DE | 112007002198 T5 | 7/2009 |

(Continued)

OTHER PUBLICATIONS

Office Action (The First Office Action) issued Oct. 13, 2024, by the State Intellectual Property Office of People's Republic of China in corresponding Chinese Patent Application No. 202210416955.X and an English translation. (18 pages).

*Primary Examiner* — Jonathan G Jelsma
(74) *Attorney, Agent, or Firm* — Buchanan Ingersoll & Rooney PC

(57) ABSTRACT

An electrically or partially electrically operated vehicle. The vehicle has a battery system and a structural component, wherein the battery system and the structural component have outer surfaces which are spaced apart from one another. The vehicle has provisions for changing the quality of a thermal coupling between the two outer surfaces, in particular for thermally coupling and decoupling the two outer surfaces.

14 Claims, 2 Drawing Sheets

(56) References Cited

U.S. PATENT DOCUMENTS

Figure 1:
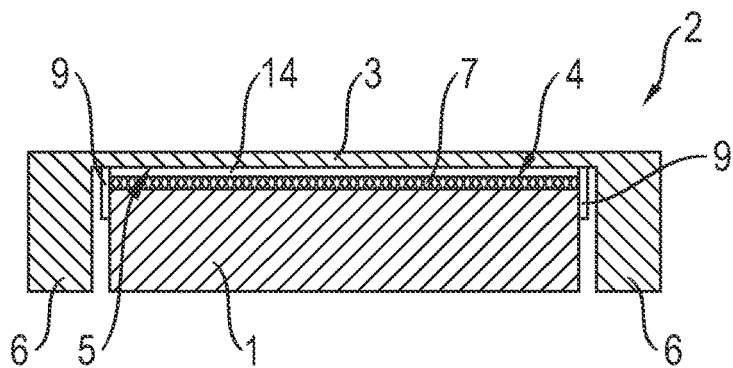

2019/0047429 A1* 2/2019 Torkelson ........... H01M 10/625
2019/0245170 A1   8/2019 Brinkmann et al.
2020/0343576 A1   10/2020 Tsuruta et al.

FOREIGN PATENT DOCUMENTS

| DE | 102011075989 A1 | 11/2012 | | |
|---|---|---|---|---|
| DE | 102018104935 A1 | 9/2019 | | |
| DE | 102018216985 A1 | 4/2020 | | |
| DE | 102019001687 A1 | 9/2020 | | |
| FR | 3079354 A1 | 9/2019 | | |
| WO | WO-2020049249 A1 * | 3/2020 | .......... | H01M 10/425 |

* cited by examiner

ELECTRICALLY OR PARTIALLY ELECTRICALLY OPERATED VEHICLE HAVING MEANS FOR CHANGING THE QUALITY OF A THERMAL COUPLING BETWEEN A BATTERY SYSTEM AND A STRUCTURAL COMPONENT

CROSS-REFERENCE TO RELATED APPLICATION

This application claims priority to German Patent Application 10 2021 109 895.5, filed Apr. 20, 2021, the content of such application being incorporated by reference herein in its entirety.

FIELD OF THE INVENTION

The invention relates to an electrically or partially electrically operated vehicle.

BACKGROUND OF THE INVENTION

Electrically or partially electrically operated vehicles have a battery system, this battery system being used to drive the electrically or partially electrically operated vehicle. To this extent, the battery system is a traction battery or the battery system has such a traction battery. Such battery systems typically also have cooling devices for cooling the battery system, in particular for cooling the traction battery. It is quite possible for a battery system to comprise a battery having a plurality of battery cells, a cooling system and a battery system housing.

US 2018/0269548 A1, which is incorporated herein by reference, discloses a battery module having a plurality of battery cells and a cooling plate, wherein the battery cells are thermally coupled to the cooling plate via a heat-conducting element.

DE 10 2018 104 935 A1, which is incorporated herein by reference, discloses a battery module having a plurality of battery cells, power electronics and a system for cooling the power electronics, wherein a heat-conducting element is arranged for this purpose between the power electronics and the battery cells. The heat-conducting element is connected over an extended area to a respective battery cell and is connected to a part of the power electronics which is adjacent to the respective battery cell by means of a respective arched portion integrally formed on the heat-conducting element.

US 2020343576 A1, which is incorporated herein by reference, discloses a battery having a plurality of battery cell modules, wherein each battery cell module has a temperature control device having a heating element and a cooling element.

SUMMARY OF THE INVENTION

In the case of very high charging and discharging currents, such cooling is often not sufficient to dissipate the heat produced sufficiently well from the battery system. This leads to, in some cases, severe heating of the battery system and of all the components thermally connected to the battery system. Very high charging and discharging currents, such as occur, for example, during rapid charging of the battery system at a rapid charging column or when there is a demand for very high engine power outputs, are particularly critical. This can lead to the battery system or components thermally connected to the battery system exceeding a temperature critical for the battery system or for these components during charging processes or during periods of demand, in particular prolonged periods of demand, for high power outputs, and damage may occur. The cooling of the battery system is then often no longer sufficient or is too slow to adequately cool the battery system and the components connected thereto. Moreover, a high demand for cooling by the cooling system of the battery is associated with a correspondingly high energy consumption by the cooling system.

Described herein is an electrically or partially electrically operated vehicle having a battery system which overcomes the abovementioned disadvantages, in particular makes it possible to cool the battery system as required if high charging and discharging currents occur, optionally in addition to other cooling mechanisms of the battery system.

The electrically or partially electrically operated vehicle according to aspects of the invention has a battery system and a structural component, wherein the battery system and the structural component have outer surfaces which are spaced apart from one another, wherein the vehicle has means for changing the quality of a thermal coupling between the two outer surfaces of the battery system and of the structural component.

The vehicle makes use of the effect that thermally larger masses heat up less than thermally smaller masses for the same energy absorption. Furthermore, the vehicle makes use of the fact that the thermal power transmitted by heat conduction is proportional to the temperature difference between the thermally coupled surfaces, i.e. the two outer surfaces, the thermal conductivity of the material arranged between the two surfaces and the distance between the two outer surfaces.

The better or higher the quality of the thermal coupling between the two surfaces, the greater the heat flow between these two surfaces at a given temperature difference. If the battery system has a higher temperature than the structural component, heat is transferred from the battery system to the structural component, wherein the higher the quality of the thermal coupling between the two outer surfaces, the greater the heat flow at a given temperature difference. Accordingly, the heat flow from the battery system to the structural component and vice versa at a given temperature difference is greater the higher the quality of the thermal coupling. In the limiting case, the two outer surfaces are thermally decoupled, and therefore there is no heat flow at all.

In order to avoid an excessive increase in the temperature of the battery system, the relatively warm battery system can be thermally coupled to the relatively cold structural component in order to additionally cool said battery system. As a result, during a charging operation for example, a high charging current can be applied for longer before a critical temperature of the battery system is exceeded since, in addition to the battery system, the structural component is also heated or heat is transferred particularly well from the battery system to the structural component. As a result, it may be possible to dispense with active cooling of the battery system during the charging process, or at least to reduce the cooling capacity.

Since the vehicle has means for changing the quality of thermal coupling between the two outer surfaces, in particular for thermally coupling and decoupling the two outer surfaces, need-based coupling of the battery system and of the structural component can take place, for example if a critical temperature of the battery system is exceeded, the battery system can be thermally coupled to the structural component or the quality of the thermal coupling can be increased in order to transfer heat from the relatively warm battery system to the relatively cold structural component. However, it is also quite conceivable to increase the thermal mass which heats up by thermal coupling before a temperature difference occurs.

One disadvantage of good thermal coupling between the two outer surfaces is that a temperature change of the battery system for the purpose of cooling the battery system is, on the other hand, particularly efficient if only the battery system, that is to say a smaller thermal mass, is cooled. In this case, it is preferable for thermal coupling between the two outer surfaces to be relatively poor, in particular for the two outer surfaces to be thermally decoupled.

The solution according to aspects of the invention offers the particular advantage that, in particular depending on the temperature difference between the battery system and the structural component, in particular also brief heat peaks, such as occur, for example, during charging of the battery system and at high powers, heat is temporarily transferred to the relatively cold structural component by thermal coupling of the outer surfaces. It is thereby possible to avoid temperature peaks and, in addition, to relieve the load on the cooling systems of the battery. Thus, the invention makes it possible to vary the thermal mass of the battery system as required. In this context, the structural component forms as it were a buffer which does not have to be cooled or heated at all times but can be coupled thermally to the battery system in a targeted manner in order to heat or remove heat from the battery system.

It is therefore regarded as particularly advantageous if the means comprise a device for changing the thermal conductivity of a material arranged between the two outer surfaces and/or for exchanging material located there and/or for changing the distance between the two outer surfaces.

The structural component is, in particular, a body component.

The battery system is preferably mounted so as to be movable in the vehicle, wherein the means have a drive for moving the battery system relative to the structural component. In particular, the battery system is mounted so as to be movable in a vertical direction of the vehicle.

It is regarded as particularly advantageous if the battery system can be moved between a first end position and a second end position, wherein the outer surfaces are thermally decoupled in the first end position and are thermally coupled in the second end position, in particular an air gap is present between the outer surfaces in the first end position and no air gap is present in the second end position.

Furthermore, it is regarded as advantageous if a deformable heat-conducting element, preferably an elastically deformable heat-conducting element, in particular a heat-conducting pad, is arranged between the outer surface of the battery system and the outer surface of the structural component. As a particular preference, the deformable heat-conducting element makes contact with the two outer surfaces in the second end position. In particular, the deformable heat-conducting element serves to compensate for tolerances and/or unevenness between the two outer surfaces in order to achieve particularly good thermal coupling in the thermally coupled position, for example the second end position.

It is quite conceivable for the means to have an expandable heat-conducting element and a device for expanding the expandable heat-conducting element, wherein the expandable heat-conducting element is arranged in a space formed between the two outer surfaces. By means of the expandable heat-conducting element, it is possible, for example, for an air gap between the two outer surfaces to be filled, when required, by the expandable heat-conducting element in order to improve the thermal coupling between the two outer surfaces.

It is regarded as particularly advantageous if the distance between the battery system and the structural component is invariable.

It is preferable if at least one cavity is formed between the outer surfaces, preferably a plurality of cavities being formed, wherein the means have a conveying device for filling the at least one cavity with a fluid, and a conveying device for emptying the at least one cavity. The conveying device for filling the cavity and the conveying device for emptying the cavity can certainly be realized in one and the same conveying device, this conveying device having two different operating modes, namely one for filling and one for emptying the cavity. The fluid is preferably a liquid. When the cavity is emptied, the cavity is preferably free of this liquid or substantially free of this liquid, wherein the cavity is then preferably filled with ambient air and/or has a vacuum.

It is regarded as particularly advantageous if the vehicle has a cooling circuit with a coolant, wherein the fluid for filling the at least one cavity is the coolant.

One or more sealing elements are preferably arranged between the battery system and the structural component in order to form the at least one cavity.

It is regarded as particularly advantageous if the means are designed as actively controllable means, and therefore the change in the quality of the thermal coupling, in particular thermal coupling and decoupling, can be initiated by a control unit of the vehicle.

It is regarded as particularly advantageous if the control unit is configured, when the battery system is being charged at an external charging station, to control the means in such a way that the thermal coupling between the outer surfaces is increased, in particular the outer surfaces are thermally coupled.

It is quite conceivable for a material to be arranged between the two outer surfaces, wherein the thermal conductivity of this material from the outer surface of the battery system to the outer surface of the structural component can be changed by applying an electric voltage to this material.

It is also quite conceivable for a closed-cell foam to be used as the material between the two outer surfaces, which foam rests with one side against the battery system and with the other side against the structural component. The cells of the foam are filled with a medium which is liquid at low temperatures and gaseous at temperatures above a limit temperature, as a result of which the foam has a high thermal conductivity when the medium is liquid and a low thermal conductivity when the medium is gaseous. As a result, the thermal conductivity is dependent on the temperature of the foam, and therefore the quality of the thermal coupling is initiated as it were by the temperature of the battery system and of the structural component, and thus passively.

It is quite conceivable for the structural component to be an underbody protection device. It is also quite conceivable for further outer surfaces of the battery system to be thermally coupled and decoupled to and from further structural components.

It is regarded as particularly advantageous if sensors for measuring a charging current and/or discharging current and/or sensors for measuring the temperature of the battery system and/or the temperature of the structural component are provided in the vehicle, wherein output signals of the sensors form input variables of the control unit. The control unit can then vary the quality of the thermal coupling, in particular can initiate thermal coupling or decoupling, depending on the temperature difference and the temperature, for example. Thus, for example, at low outside temperatures and associated low temperatures of the structural components, it is disadvantageous to couple the battery system to the structural component if the temperatures of the structural component are below a preferred operating temperature of the battery system. Conversely, at particularly high outside temperatures and associated high temperatures of the structural component, it is disadvantageous to couple the structural component thermally to the battery system if the temperatures of the structural component are above a preferred operating temperature of the battery system.

BRIEF DESCRIPTION OF THE DRAWING FIGURES

Figure 2:
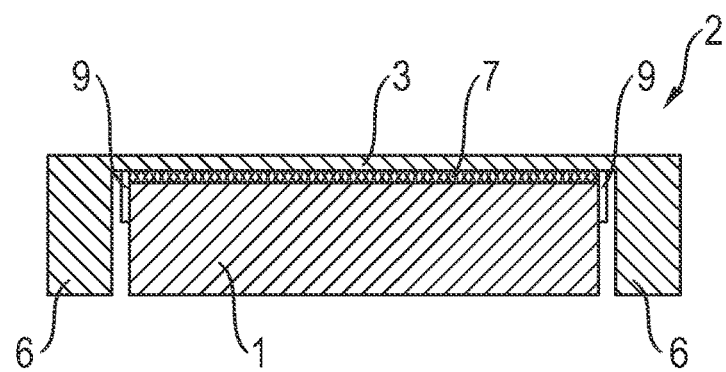
Figure 3:
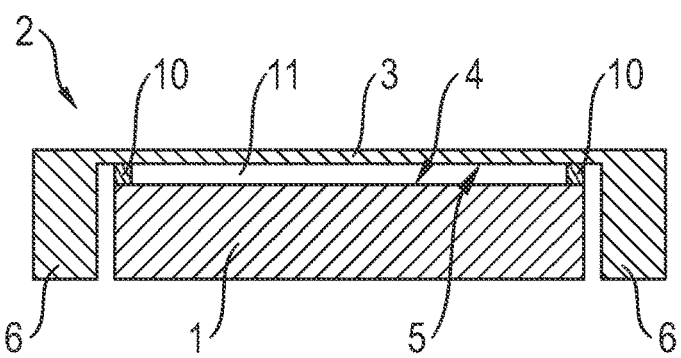
Figure 4:
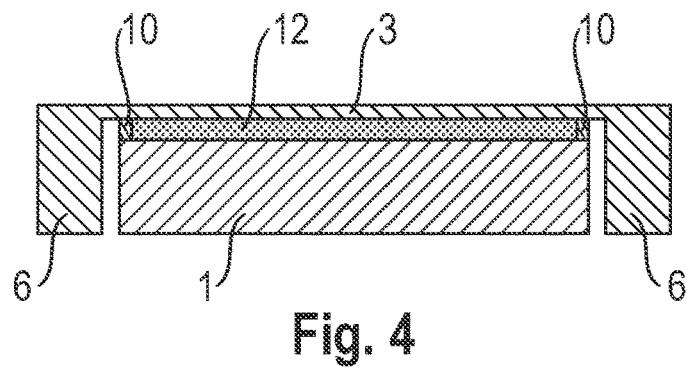
Figure 5:
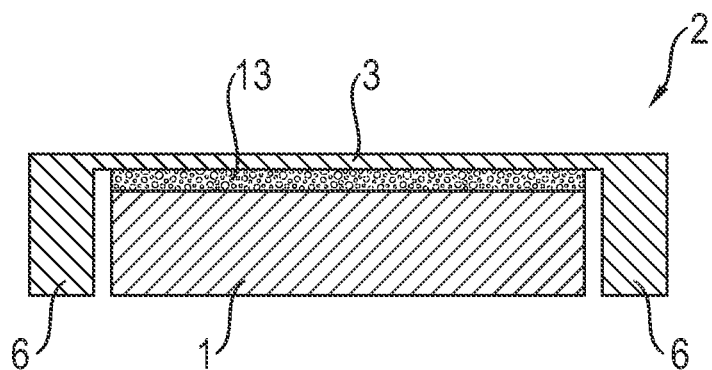
Figure 6:
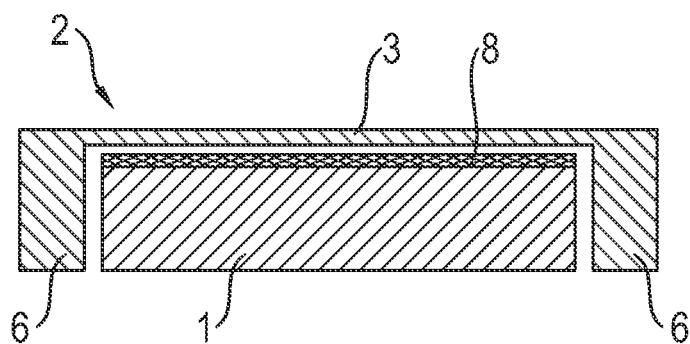

The invention is explained in greater detail in the following figures by means of exemplary embodiments without being restricted thereto. More specifically:

FIG. 1 shows an arrangement of a battery in the region of a vehicle body in a sectional view in a thermally decoupled state, FIG. 2 shows the arrangement according to FIG. 1 in a thermally coupled state, FIG. 3 shows another exemplary embodiment of the invention in a view like that in FIG. 1 in a thermally decoupled state, FIG. 4 shows the arrangement according to FIG. 3 in a thermally coupled state, FIG. 5 shows another exemplary embodiment of the invention in a view like that in FIG. 1, and FIG. 6 shows another exemplary embodiment of the invention in an illustration like that in FIG. 1 in a thermally decoupled state.

DETAILED DESCRIPTION OF THE INVENTION

FIGS. 1 and 2 show a first embodiment of the invention. The electrically or partially electrically operated vehicle has a battery system 1 and a structural component 3, wherein the structural component 3 is in the present case a body component which connects two sills 6 to one another. The battery system 1 has an outer surface 4 facing the structural component 3, and the structural component 3 has an outer surface 5 facing the battery system 1. These two outer surfaces 4, 5 are spaced apart. A deformable heat-conducting element 7, in the present case a heat-conducting pad, is arranged between the outer surface 4 of the battery system 1 and the outer surface 5 of the structural component 3, wherein the deformable heat-conducting element 7 makes contact with the outer surface 4 of the battery system 1 and is connected to it in the state shown in FIG. 1.

The vehicle has means for changing the quality of thermal coupling between the two outer surfaces 4, 5, wherein these means are formed by a drive 9 for moving the battery system 1 relative to the structural component 3, wherein the battery system 1 can be moved in the vertical direction Z of the vehicle by means of the drive 9. In the present case, the battery system 1 can be moved between a first end position, which is shown in FIG. 1, and a second end position, which is shown in FIG. 2, wherein the outer surfaces 4, 5 are thermally decoupled in the first end position, in the present case in FIG. 1, and are thermally coupled in the second end position, in the present case in FIG. 2. In the first end position, there is an air gap 14 between the outer surfaces 4, 5, namely between the heat-conducting element 7 and the structural component 3, whereas there is no air gap in the second end position. Accordingly, the thermal coupling is of a lower quality in its first end position than in the second end position.

FIGS. 3 and 4 show another embodiment of the invention, wherein a cavity 11 is formed between the outer surfaces 4, 5, wherein for this purpose a plurality of sealing elements 10 is arranged between the battery system 1 and the structural component 3. This cavity 11 can be filled with a fluid 12 if higher-quality heat coupling is required, as illustrated in FIG. 4. For the purpose of thermal decoupling, it is quite possible for the cavity 11 to be evacuated.

FIG. 5 shows another embodiment of the invention, wherein in this embodiment a closed-cell foam 13 is arranged between the outer surfaces 4, 5. The thermal conductivity of the closed-cell foam 13 can be variable, for example.

However, it is also quite conceivable for an expandable heat-conducting element 8 to be arranged between the two outer surfaces 4, 5, as shown in FIG. 6. If required, this expandable heat-conducting element 8 is expanded in order to increase the quality of the thermal coupling between the two outer surfaces 4, 5, more specifically to close an air gap 14 between the two outer surfaces 4, 5.

The invention thus makes it possible to thermally couple the battery system 1 to the structural component 3 or to vary the quality of the thermal coupling, thereby making it possible to use a large or small thermal mass as required.

It is also quite conceivable for outside air to be introduced, if required, into any cavity or air gap which may be present between the outer surfaces 4, 5. In this case, it is quite conceivable for corresponding flaps in an intake region of the vehicle to be opened or closed for ambient air.

LIST OF REFERENCE SIGNS 1 battery system
2 body
3 structural component
4 outer surface
5 outer surface
6 sill
7 deformable heat-conducting element
8 expandable heat-conducting element
9 drive
10 sealing element
11 cavity
12 fluid
13 foam
14 air gap

What is claimed:

1. An electrically or partially electrically operated vehicle comprising:
    a battery system and a structural component, wherein the battery system and the structural component each have an outer surface, and an outer surface of the battery system is spaced apart from an outer surface of the structural component,
    means for changing a quality of a thermal coupling between the two outer surfaces and for thermally coupling and decoupling the two outer surfaces, wherein the means are actively controllable means,
    one or more cavities formed between the outer surfaces, wherein the means comprise a conveying device for selectively (i) filling the one or more cavities with a liquid and (ii) emptying the one or more cavities, a control unit for changing the quality of the thermal coupling, first sensors for measuring a charging current and/or discharging current, second sensors for measuring a temperature of the structural component, and third sensors for measuring a temperature of the battery system, wherein output signals of the first, second and third sensors form input variables of the control unit, and wherein the control unit is configured to either thermally couple or decouple the two outer surfaces as a function of a temperature differential between the structural component and the battery system, wherein the control unit is configured to (i) compare the temperature of the structural component and an ambient temperature with a target battery temperature and (ii) thermally decouple the two outer surfaces when the temperature of the structural component and/or the ambient temperature is/are below the target battery temperature.

2. The vehicle as claimed in claim 1, wherein the structural component is a body component.

3. The vehicle as claimed in claim 1, wherein the vehicle has a cooling circuit with a coolant, and wherein said liquid is the coolant.

4. The vehicle as claimed in claim 1, wherein one or more sealing elements are arranged between the battery system and the structural component in order to form the one or more cavities.

5. The vehicle as claimed in claim 1, wherein the control unit is configured, when the battery system is being charged, to control the means to thermally couple the outer surfaces.

6. The vehicle as claimed in claim 1, wherein the conveying device has a first operating mode for filling the one or more cavities and a second operating mode for emptying the one or more cavities.

7. The vehicle as claimed in claim 1, wherein an air gap is defined in the one or more cavities when the one or more cavities are emptied of the liquid and an air gap is not defined in the one or more cavities when the one or more cavities are filled with the liquid.

8. The vehicle as claimed in claim 7 further comprising a moveable flap disposed in an intake region of the vehicle, wherein, in an open position of the moveable flap, the moveable flap is configured to direct ambient air into the air gap, and in a closed position of the flap, the moveable flap is not configured to direct ambient air into the air gap.

9. The vehicle as claimed in claim 1, wherein the control unit is configured to thermally decouple the two outer surfaces when the temperature of the structural component and the ambient temperature are both below the target battery temperature.

10. The vehicle as claimed in claim 1, wherein the structural component comprises opposing side sills of the vehicle and a member coupling the opposing side sills, wherein the member and the opposing side sills are thermally coupled together to disperse thermal energy produced by the battery system when the two outer surfaces are coupled together.

11. The vehicle as claimed in claim 10, wherein the battery system is not directly coupled to the side sills.

12. An electrically or partially electrically operated vehicle comprising:

a battery system and a structural component, wherein the battery system and the structural component each have an outer surface, and an outer surface of the battery system is spaced from an outer surface of the structural component, means for changing a quality of a thermal coupling between the two outer surfaces and for thermally coupling and decoupling the two outer surfaces, wherein the means are actively controllable means, one or more cavities formed between the outer surfaces, wherein the means comprise a conveying device for selectively (i) filling the one or more cavities with a liquid and (ii) emptying the one or more cavities, a control unit for changing the quality of the thermal coupling, first sensors for measuring a charging current and/or discharging current, second sensors for measuring a temperature of the structural component, and third sensors for measuring a temperature of the battery system, wherein output signals of the first, second and third sensors form input variables of the control unit, wherein the control unit is configured to either thermally couple or decouple the two outer surfaces as a function of a temperature differential between the structural component and the battery system, and wherein the control unit is configured to (i) compare the temperature of the structural component and an ambient temperature with a target battery temperature and (ii) thermally decouple the two outer surfaces when the temperature of the structural component and/or the ambient temperature is/are above the target battery temperature.

13. The vehicle as claimed in claim 12, wherein the control unit is configured to thermally decouple the two outer surfaces when the temperature of the structural component and the ambient temperature are both above the target battery temperature.

14. An electrically or partially operated vehicle comprising:

a battery system and a structural component, wherein the battery system and the structural component each have an outer surface, and an outer surface of the battery system is spaced apart from an outer surface of the structural component, means for changing a quality of a thermal coupling between the two outer surfaces and for thermally coupling and decoupling the two outer surfaces, wherein the means are actively controllable means, one or more cavities formed between the outer surfaces, wherein the means comprise a conveying device for selectively (i) filling the one or more cavities with a liquid and (ii) emptying the one or more cavities, a control unit for changing the quality of the thermal coupling, first sensors for measuring a charging current and/or discharging current, second sensors for measuring a temperature of the structural component, and third sensors for measuring a temperature of the battery system, wherein output signals of the first, second and third sensors form input variables of the control unit, wherein the control unit is configured to either thermally couple or decouple the two outer surfaces as a function of a temperature differential between the structural component and the battery system, and wherein the control unit is configured to (i) compare the temperature of the structural component and an ambient temperature with a target battery temperature, (ii) thermally decouple the two outer surfaces when the temperature of the structural component and/or the ambient temperature is/are below a first target battery temperature, and (iii) thermally decouple the two outer surfaces when the temperature of the structural component and/or the ambient temperature is/are above a second target battery temperature.

* * * * *